May 6, 1941.　　　　H. W. PRICE　　　　2,241,071
TRANSMISSION OPERATING MECHANISM
Filed Aug. 8, 1938　　　2 Sheets-Sheet 1
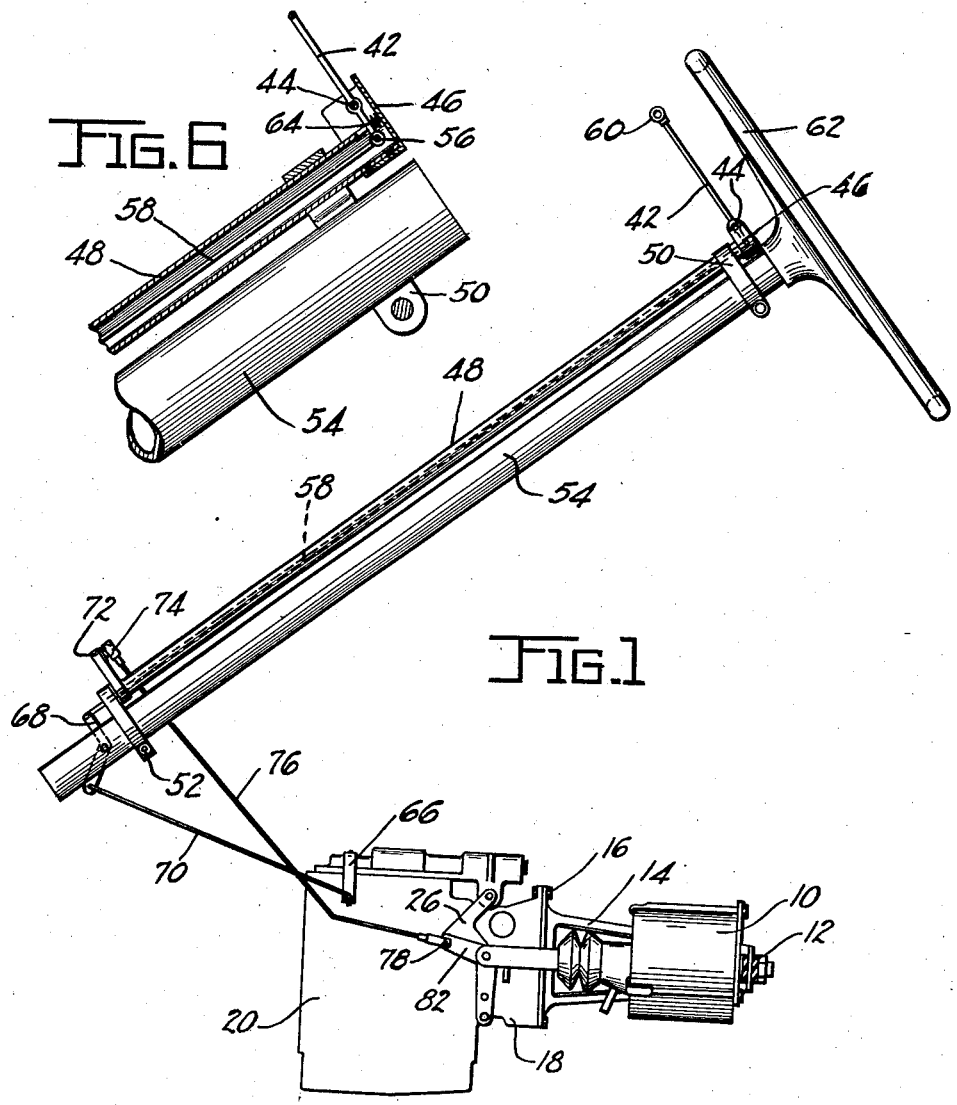
INVENTOR.
HAROLD W. PRICE
BY
H. O. Clayton
ATTORNEY.

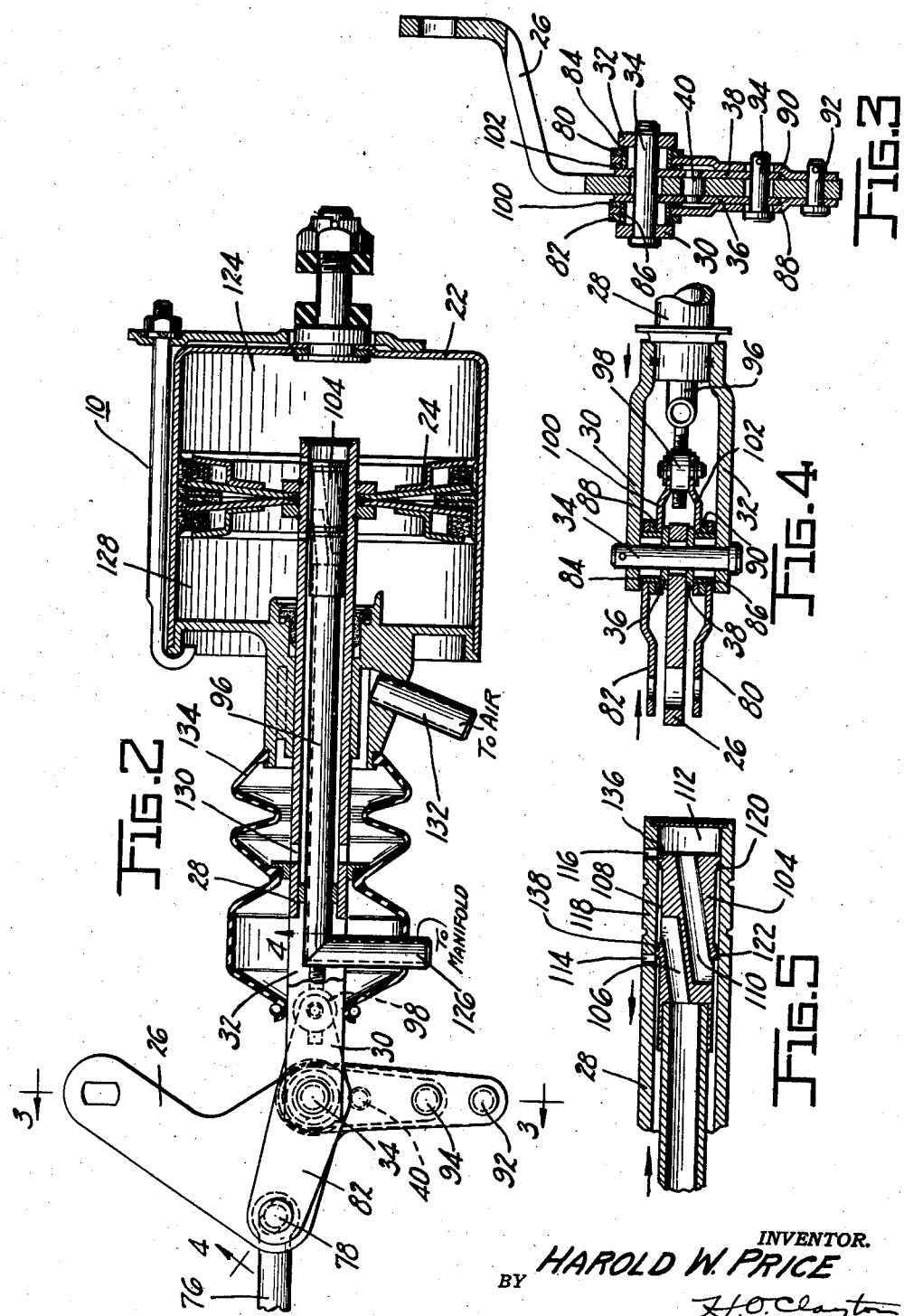

Patented May 6, 1941

2,241,071

UNITED STATES PATENT OFFICE 2,241,071

TRANSMISSION OPERATING MECHANISM

Harold W. Price, South Bend, Ind., assignor to Bendix Products Corporation, South Bend, Ind., a corporation of Indiana Application August 8, 1938, Serial No. 223,629

6 Claims. (Cl. 74—335)

This invention relates to transmission operating means, and more particularly to means for operating the change-speed transmission of an automotive vehicle.

One of the objections to the mechanism for operating the three-speeds forward and reverse transmission of the day is the length of movement required of the gear shift lever, or, if the movement is small, the relatively large force required to move said lever. It is also to be noted that the present day gear shift lever constitutes an obstruction in the driver's compartment and prevents complete freedom of movement of the driver and other occupants.

It is therefore one of the objects of the present invention to provide a transmission gear control mechanism so constituted as to avoid the above-referred-to difficulties.

Another object is to provide, in a transmission gearing controlling mechanism having gears shiftable by power, a manually operable pivotally mounted controlling device located adjacent the operator, i. e., beneath the steering wheel or on the dashboard, and movable in a manner simulating the movement of a conventional gear shift lever for controlling the shiftable gears.

A further object is to provide, in a manually controlled power operated gear shifting mechanism, a novel control apparatus therefor including an arrangement insuring that the extent of movement of the gear shifting member will be substantially proportional to the extent of movement of the control member, whereby an exceedingly accurate control may be exercised by the operator over the shifting of the gears. Such a mechanism is known in the art as a follow-up control, and in one embodiment of my invention there is disclosed a so-called line type of follow-up valve for controlling an air-suspended motor operable to establish the transmission in any one of its four settings.

A still further object is to provide a fluid pressure operated power gear shifting mechanism having a manually operable control member and means controlled thereby in such a manner that the movements of such control member to effect a shifting of the transmission gears will be resisted by a force substantially proportional to the extent of movement of the gear shifting member and also proportional to the force exerted by the transmission operating power means, whereby a "feel" or reaction to shifting will be experienced by the operator in a manner simulating the reaction encountered in manually shifting the transmission gears in the conventional manner.

Yet another object of the invention is to provide a simple and compact mechanism for operating an automotive transmission, said mechanism consisting of relatively few parts which may be quickly applied to the transmission of a used car.

Other objects of the invention and desirable details of construction and combinations of parts will become apparent from the following description of a preferred embodiment, which description is taken in conjunction with the accompanying drawings, in which:

Figure 1 is a view disclosing, in side elevation, the transmission operating mechanism constituting my invention;

Figure 2 is a view, partly in section and partly in side elevation, disclosing in detail the transmission operating motor, its control valve and a part of the valve and transmission operating linkage;

Figure 3 is a sectional view of the valve and transmission operating linkage mechanism, taken on line 3—3 of Figure 2;

Figure 4 is another sectional view of the aforementioned linkage, taken on the line 4—4 of Figure 2;

Figure 5 is an enlarged view of the motor controlling valve mechanism disclosed in Figure 2; and Figure 6 is an enlarged sectional view of Figure 1, disclosing details of the selector mechanism for controlling the transmission operating mechanism constituting my invention.

In that embodiment of my invention disclosed in Figure 1, a double-ended pressure differential operated motor 10 is secured at 12 to a cup-shaped bracket 14. This bracket is secured by fastenings 16 to a portion of the casing 18 of a three-speeds forward and reverse transmission 20. This transmission includes the usual shift rails and means for selecting the rails to be operated; accordingly, no claim is made thereto, and the same is not disclosed in detail.

The transmission operating motor 10, which is disclosed in detail in Figure 2, comprises a cylinder member 22, which houses a piston 24 reciprocable therein. The piston, constituting the power element of the motor, is operably connected to a shift rail operating crank 26 by means of a tubular connecting rod 28, strap members 30 and 32, secured to one end of the rod and providing a fork member, a pin 34 extending through the ends of the members 30 and 32, and so-called reaction levers 36 and 38 pivoted to the crank 26 by a pin 40.

Referring now to Figure 1 and briefly describing the remaining principal elements of my transmission operator, a selector 42, which is disclosed in detail in Figure 6, is pivotally mounted on a pin 44 secured to a hollow casing 46. The casing is secured to the upper end of a tubular member 48, which is fastened by brackets 50 and 52 to the steering post 54 of the vehicle. The selector is pivotally connected at its inner end 56 to a rod 58, which extends within the tubular member 48, the latter closely paralleling the steering post.

When it is desired to place the transmission either in low or in reverse gear, the outer end of the selector 42, which is preferably enlarged at 60, is drawn upwardly toward the steering wheel 62, and it is apparent that this may be done without removing the hand from the steering wheel. This upward movement is resisted by a spring 64, Figure 6, which functions to bias the selector and shift rail selecting mechanism of the transmission to a position preparatory to placing the transmission either in high or in second gear. This operation serves to rotate a crank 66 counterclockwise, thereby actuating the shift rail selector mechanism of the transmission to make possible an operation of the transmission to place the same either in low or in reverse gear. As disclosed in Figure 1, the crank 66 is secured to the rod 58 by means of a bell crank lever 68, pivotally mounted on the post 54, and a link 70, interconnecting the lever 68 and crank 66. The aforementioned selector mechanism selects for subsequent operation one or the other of the two shift rails of the transmission.

The transmission is now prepared for either a low or a reverse gear operation, and assuming that low gear is desired, the selector 42 is rotated clockwise, thereby rotating, in the same direction, the tubular member 48 and a crank 72 secured to the lower end thereof. This crank is connected by a ball and socket unit 74 to a link 76, which is pivotally connected by a pin 78 to one end of links or straps 80 and 82. As disclosed in Figure 4, links 80 and 82 are provided at their other ends with openings to receive sleeve members 84 and 86. When the crank 72 is rotated clockwise, the link 76 and links 80 and 82 are placed in compression, moving the same to the right, as indicated by the arrows in Figures 4 and 5. This movement serves to rotate, in a clockwise direction, cranks 88 and 90, having openings at one end to receive the sleeves 84 and 86 and pivotally secured at their other ends by a pin 92 to the transmission operating crank 26. As clearly disclosed in Figure 3, the so-called reaction levers 36 and 38 are pivotally connected by a pin 94 to the links 88 and 90, said reaction links being pivotally secured by the pin 40 to the crank 26. As previously described, at their upper ends, the links 36 and 38 are pivotally connected by the pin 34 to the ends of the strap members 30 and 32.

Continuing the description of the operation of placing the transmission in low gear, when the straps 80 and 82 are moved to the right, as indicated by the arrow in Figure 4, a tubular valve operating member 96, telescoped within the connecting rod 28, is also moved to the right, the member 96 being adjustably and pivotally connected at 98 to straps 100 and 102, which are also pivotally connected to the sleeves 84 and 86. When the member 96 is being moved to the right, the strap members 30 and 32 are being moved to the left, in the direction indicated by the arrows in Figures 4 and 5; for when the straps 80 and 82 are moved to the right, the links 88 and 90 are rotated about the pin 92, thus imparting a counterclockwise rotation to the reaction levers 36 and 38 and a resultant leftward movement of the members 30 and 32, connected to the links 36 and 38 by the pin 34.

To one end of the tubular member 96 there is secured a spool-shaped valve member 104, provided with a diagonally extending duct 106 interconnecting the interior of the tubular member 96 and a recess 108 in the surface of the valve member. Another diagonally extending duct 110 in the valve 104 serves to interconnect a compartment 112 with the interior of the connecting rod member 28. As disclosed in Figure 5, ports 114 and 116 are so positioned in an end portion 118 of the rod 28 and the valve member 104 is so constructed as to provide a so-called air-suspended motor. The ported end portion 118 of the rod 28 may be defined as a valve member, inasmuch as such member cooperates with the valve member 104 to constitute the motor controlling valve mechanism. The aforementioned movement of the valve member 104 to the right and the simultaneous movement of the member 118 to the left serve to effect what is defined in the art as a "cracking" of the valve mechanism.

Describing this cracking of the valve in detail, the valve members 104 and 118 are moved so that the port 116 is moved into registry with a land portion 120, constituting a part of what may be defined as one of the two full-bodied portions of the spool valve member. The port 114 is moved to be completely clear of a land portion 122 on the valve member 104, said land portion constituting a part of the remaining full-bodied portion of the valve member. This operation of the valve results in placing a compartment 124 of the motor 10 in communication with an evacuated chamber or source of vacuum via port 116, recess 108, duct 106, tubular member 96 and a conduit 126. The intake manifold of the vehicle provides a convenient evacuated chamber, for the same is partially evacuated by the reciprocating engine pistons, when the throttle is closed; and it is when the throttle is closed and the clutch is disengaged that the transmission is usually operated. To insure a disengagement of the clutch before the transmission is operated, the clutch pedal, or a part connected to the mechanism for disengaging the clutch, may be connected to a cut-off valve placed in the conduit 126 leading to the source of vacuum. With such a construction, the clutch must be disengaged before the motor 10 is connected to the source of vacuum to energize the motor and operate the transmission. When the compartment 124 is placed in communication with the partially evacuated intake manifold, the remaining compartment 128 of the motor 10 is placed in communication with the atmosphere, via valve port 114, the interior of the hollow connecting rod 28, ports 130 in said rod and a nipple 132, for connection with an air cleaner, not shown. The partial evacuation of the compartment 124 and the atmospheric pressure within the compartment 128 result in a differential of pressure acting upon the piston 24. Accordingly, the piston 24 is immediately subjected to a force moving the same to the right and resulting in a counterclockwise movement of the crank 26 to initiate the operation of placing the transmission in low gear.

Continuing the description of this operation, when the piston 24 moves to the right, the lower ends of the reaction levers 36 and 38 are subjected to a load which tends to rotate the links 88 and 90 counterclockwise. Such a movement, however, is counteracted by the selector 42, which at the time is held stationary after the valve is cracked. There is thus provided a force acting upon the selector, which is known in the art as "feel." The selector and the valve member 104 connected thereto being held stationary and the member 118 being moved to the left, as just described, result in what is defined in this art as a "lapping of the valve mechanism." In this position of the parts, the ports 114 and 116 are covered by the aforementioned land portion 120 and by a land portion 136 on the valve member 104 respectively. The movement of the valve member 118 ceases when the valve is lapped, for at that time the chamber 124 is cut off from the source of vacuum and the entire system is in equilibrium. Should the selector 42 be moved again, assuming that the shift of the transmission has not been completed, the valve mechanism will again be cracked or opened and the motor 10 again energized to again move the low and reverse shifter rail of the transmission in a direction to place the transmission in low gear.

The selector 42 is thus moved but once, or intermittently, to place the transmission in low gear, and it will be obvious that this operation closely simulates the operation of a conventional shift lever. The resistance to this movement, or so-called feel, is directly proportional to the extent of movement, for the force exerted by the motor piston 24, resulting in a load or resistance to movement of the selector and a concurrent movement of the crank 26, is directly proportional to the gaseous pressure within the compartment 124 of the motor; and the gaseous pressure decreases, to increase the force exerted by the piston, with each cracking operation of the valve mechanism, or in accordance with the length of time the valve remains open.

As is made clear by an inspection of Figure 3 of the drawings, the reaction levers 36 and 38 fulcrum on the pin 92 and therefore function as levers of the second class to effect the aforementioned movement of the crank 26, and incidentally effect the load or feel upon the selector and the follow-up to-lap operation of the valve.

In the event of failure of the motor 10, the lost motion, as disclosed in Figures 3 and 4, between the various pins, links and levers is taken up and the connection goes solid. There is thus provided means for operating the shift rails solely by the physical effort of the driver.

Stressing an important feature of my invention disclosed in Figure 5, the land 120 and a corresponding land 138, adjacent the aforementioned land 120, constitute parts of the full-bodied portions of the spool valve member which are of lesser diameter than the lands 122 and 136. The lands 120 and 138, which may be defined as steps, provide a means for throttling or metering the flow of air to and from the compartments 124 and 128 of the motor. Such a construction provides smoother gear engaging and disengaging operations of my transmission operating mechanism, for the rate of change of gaseous pressure within the motor 10 is lessened with a resultant lowering of the rate of change of loading from the piston 24.

The operation of the mechanism to place the transmission in low gear having been described in detail, it is believed unnecessary to describe the operation to place the transmission in second gear. Briefly stated however, the direction of movement of the selector 42 is reversed; that is, the selector is moved counterclockwise in a plane parallel to the plane of the steering wheel, this operation to a degree simulating the corresponding movement of a conventional shift lever. As is obvious from an inspection of Figures 2 to 5 inclusive, this operation results in a movement of the valve members 104 and 118 to the left and right respectively to again operate the valve and energize the motor 10 by partially evacuating the compartment 128 thereof and placing the compartment 124 in communication with the atmosphere. The piston 24 is thus moved to the left to place the transmission in neutral, that is, return the low and reverse shift rail to its intermediate position.

As previously described, the spring 64 serves to bias the selector 42 and the shift rail selector mechanism of the transmission to a position preparatory to placing the transmission either in second or in high gear; that is, a position wherein the second and high gear shift rail is selected for operation. Therefore, when the transmission has been placed in neutral, by rotating the selector counterclockwise, the spring 64 automatically functions to rotate the selector about the pin 44. This operation results in a rotation of the crank 66 to effect the selection of the second and high shift rail. Continued movement of the selector will again operate the follow-up valve mechanism to again energize the motor 10 and place the transmission in second gear, and subsequent rotation of the selector clockwise serves to place the transmission in high gear.

There is thus provided a very simple and compact power mechanism for operating a selective type of change-speed transmission, the manually operated selector for controlling the mechanism being conveniently mounted adjacent the steering wheel. The linkage interconnecting the selector, the shift rails of the transmission, the power element of the transmission operating motor, the valve mechanism for controlling the operation of the motor and the shift rail selector mechanism of the transmission is so constructed and arranged that the operation of the selector closely simulates an operation of a conventional shift lever in the present day automobile. The movement of the selector 42 outlines the letter "H," as is true of the conventional shifter lever; the resistance to the movement of the selector is a function of the resistance encountered by the shift rails, as, of course, is true of the conventional shift lever; and, in the event of either partial or complete failure of the power means, manual operation of the selector serves to supplement or supplant the power means for operating the transmission. Furthermore, it may be noted that the step-by-step or intermittent movement of the selector in operating the follow-up valve simulates the corresponding movement of the shift lever of a standard transmission.

While one illustrative embodiment has been described, it is not my intention to limit the scope of the invention to that particular embodiment, or otherwise than by the terms of the appended claims.

I claim:

1. In an automotive vehicle provided with a transmission mechanism, the combination with shift rails for selectively associating gears in a plurality of ratios, of means for selecting one or the other of said rails to be actuated and then moving the selected rail to establish the transmission in the desired gear ratio, said means including a pressure differential operated motor, a valve mechanism, comprising independently movable valve members, for controlling the operation of said motor, a shift rail operating crank, a transmission and valve operating selector member mounted adjacent the steering wheel of the vehicle, and force transmitting means interconnecting said latter member, the shift rail operating crank, the movable power element of the motor and the valve mechanism, said force transmitting means including two reaction levers pivotally connected to said crank, one lever on each side thereof, means, including a crank positioned by the side of one of the reaction levers and another crank positioned by the side of the other reaction lever, interconnecting the selector member, the shift rail operating crank, the reaction levers and one of the aforementioned valve members, and further including means interconnecting said reaction levers with the other of the aforementioned valve members.

2. In an automotive vehicle provided with a transmission mechanism, the combination with shift rails for selectively associating gears in a plurality of ratios, of means for selecting one or the other of said rails to be actuated and then moving the selected rail to establish the transmission in the desired gear ratio, said means including a pressure differential operated motor, a valve mechanism, comprising independently movable valve members, for controlling the operation of said motor, a shift rail operating crank, a transmission and valve operating selector member mounted adjacent the steering wheel of the vehicle, and force transmitting means interconnecting said latter member, the shift rail operating crank, the movable power element of the motor and the valve mechanism, said force transmitting means including two reaction levers pivotally connected to said crank, one lever on each side thereof, means, including a crank pivotally connected to the shift rail operating crank and positioned by the side of one of the reaction levers and another crank pivotally connected to the shift rail operating crank and positioned by the side of the other reaction lever, interconnecting the selector member, the shift rail operating crank, the reaction links and one of the aforementioned valve members, and further including means, comprising a pin, extending through the reaction levers and the aforementioned cranks, and a plurality of strap members interconnecting said reaction levers with the other of the aforementioned valve members.

3. The combination with a transmission operating member shiftable in opposite directions from neutral position into different transmission setting positions, of means for moving said operating member comprising a fluid pressure motor having a pressure responsive member for applying a force to said operating member for moving it in either direction, a manually operated selector member, a control valve mechanism including two independently movable parts one of said parts being connected to be operated by said selector member and the other of said parts being connected to said pressure responsive member to provide a follow-up valve mechanism, and means, constituting a part of said connections, for utilizing differential pressures in said motor resulting from operation of said valve mechanism by said manual member, for effecting a force reaction on the manual member substantially proportional to the force developed by the fluid pressure motor, said last named means including two reaction levers each lever being connected to both of the movable valve parts and to the selector member.

4. The combination with a shiftable transmission operating member, of means for moving said member comprising a crank, a motor provided with a piston, valve means for controlling the operation of said motor, a manually operable selector member accessible to the operator and connected to control the energization of said motor, a plurality of reaction levers pivotally connected to said crank, and force transmitting means interconnecting the selector, valve means, piston and reaction levers, said force transmitting means including means, comprising a pin, interconnecting one end of the reaction levers and one of the valve members, and means, comprising a plurality of cranks, interconnecting the other end of said levers with the selector and the other valve member.

5. The combination with a shiftable transmission operating member of means for moving said member comprising a motor provided with a piston, valve means for controlling the operation of said motor, a transmission operating crank, a manually operable selector member accessible to the operator and connected to control the energization of said motor, a plurality of reaction levers pivotally connected to said crank and force transmitting means interconnecting the selector, piston, valve means and reaction levers, said force transmitting means including a plurality of cranks pivoted to the transmission operating crank and having pivoted thereto, intermediate their ends, the aforementioned reaction levers and further including a plurality of straps in the connection between one of the valve members and the selector, said straps being pivotally connected to the reaction levers.

6. The combination with a shiftable transmission operating member, of means for moving said member comprising a crank, a fluid pressure motor for applying a force to the transmission operating member, valve means, including two independently movable parts, for controlling the operation of said motor, a manually operated selector accessible to the operator, and force transmitting means interconnecting the power element of the motor, the crank, the selector, and the two parts of the valve means, said force transmitting means including a reaction lever pivotally connected to one side of said crank and another reaction lever pivotally connected to the other side of said crank for applying a force to said selector substantially proportional to the aforementioned force, opposing all movements thereof from any position simultaneously with the application of said first mentioned force and further including linkage, cooperating with said reaction levers, so constructed and arranged as to effect a movement of the aforementioned valve parts in opposite directions to open the valve when the selector is first moved.

HAROLD W. PRICE.